INVENTORS
VICTOR BAYERL
MARTIN QUARG
HEINZ VIEHWEG

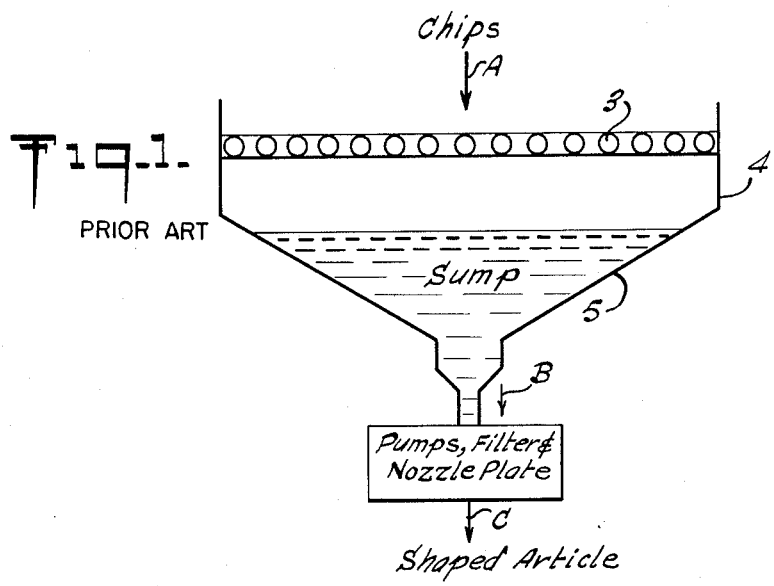
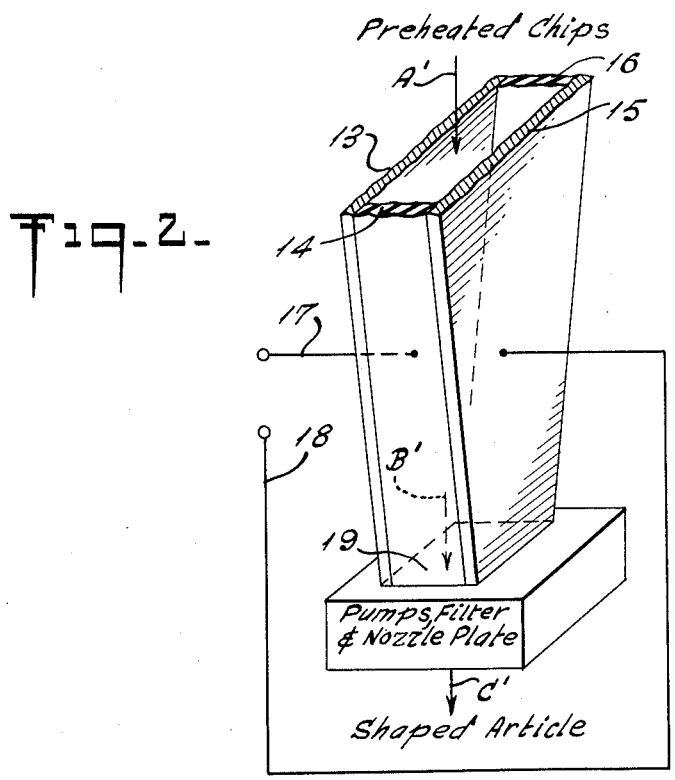

INVENTORS
VICTOR BAYERL
MARTIN QUARG
HEINZ VIEHWEG 3,218,430
DEVICE FOR PREPARING A MELT
FROM HIGH POLYMERS
Victor Bayerl, Martin Quarg, and Heinz Viehweg, Leipzig, Germany, assignors to Veb Konstruktions- und Ingenieurburo Chemie, Leipzig, Germany
Filed July 10, 1961, Ser. No. 122,983
2 Claims. (Cl. 219—10.65)

The present invention relates to a process and a device for preparing a melt from solid high polymers, from which in a subsequent operation solid articles of different shapes may be obtained by appropriate shaping operations. Thus it is possible to make from the melt prepared according to the invention plates, sheets, mouldings, and the like, and, in a preferred embodiment, to spin fibers therefrom.

When fibers are to be made from synthetics, e.g. high polymers, the first step consists of melting the granular high polymers so as to convert them into an even viscous liquid which is subsequently passed under pressure through a suitable device for obtaining the desired threads.

The melting of the high polymers to be spun is accomplished in spinning heads by means of electrically heated or steam-heated melting grids. The grids consist of various arrangements of heated tubes onto which the solid product is dropped. As the chips of the high polymer come to lie on the tubes, they are heated up so that they will drip from the tubes in molten state. Below the tubes, the liquid is collected in a sump from which the melt is passed on to and through spinning nozzles.

The efficiency of such grids in heating and melting the polymers is limited per square unit of the grid surface by the fact that the grid temperature cannot be made very high, so as to avoid overheating the polymer and causing its degradation. Since however the spinning nozzles must be continuously supplied with the necessary molten material, in order to provide uninterrupted thread formation, it is necessary to make the grids of a comparatively large surface.

Another drawback inherent in the use of grids made of tubes, consists of the difficulty of maintaining an even temperature throughout the surface of the grids.

The conventional devices for melting the high polymers comprise a flat grid arranged above a funnel-shaped melt-receiving part forming a sump that leads to a duct.

The surface of the grid is considerably larger than the surface of the cross section of the duct leading to the pumps. Consequently, the time which the polymer is made to stay on the grid varies for different particles due to the fact that individual particles near the conical wall surface will slide down at a lower rate than those which happen to be near the center where they arrive at the sump under the influence of gravity unobstructed by friction. The provision of a storage sump makes it necessary that between the melting and the spinning a certain time will lapse which is not easily controlled. During this time, undesirable reaction will occur, namely degradation and re-formation of monomers. The latter depends to a large extent on how long the product will remain in molten stage before it is made to solidify as a thread. Due to the dependence of the monomer formation on time, it is only possible to keep the content in monomer low, if the time lapsed between melting and spinning can be kept very short. However, as mentioned above, this is only possible to a limited extent when spinning heads with an inbuilt grid of tubes are used.

As a result of the above-mentioned drawbacks inherent in grids, and funnel-shaped melt vessels, the high quality of the fibers obtained has certain limitations; it is, moreover, rather uneven. It may be a consequence of such unevenness of quality that the spun product is sometimes not useful for further processing.

It is an object of the present invention to overcome the above-mentioned disadvantages of the existing devices for the processing of high polymers and to provide devices which make it possible to maintain uniform temperature for the polymers to be spun.

It is a further object of the invention to provide a process and device which permits to maintain the mass in molten state over a short time only, before passing it on to the spinning heads.

It is a further object of the invention to provide a device which avoids the occurrence of marginal temperatures which are higher than the temperatures at the center of the melt.

As a consequence the melting procedure will be effected rapidly without the danger of overheating and the melt will be passed on evenly and continuously to the spinning pumps.

Other objects and advantages will become apparent from the following detailed description.

Generally speaking, the invention consists in a process for making melts from solid high polymers for the use of subsequently making shaped articles therefrom and it comprises feeding solid polymers into and through an elongated zone in downward direction from top to bottom, exposing them during their passage to the heat generated in a high frequency electrical field until the solids have become uniformly melted and directly passing on the melt in a continuous flow to a shaping operation. In case of fibers to be spun, the melt is passed on directly to the spinning heads of a fiber spinning device.

The invention also relates to a device for carrying through the above outlined process, said device comprising an elongated vertical shaft having a top opening for receiving the solid polymers and a bottom opening for discharging the melt, electrode means arranged along the path of said polymer in said shaft in spaced relationship with respect to one another, a source of high frequency voltage connected to the electrode means and capable of generating a high frequency field in the path of said products whereby said solids become uniformly melted and capable of being passed on directly in a continuous flow to a shaping, e.g. a spinning operation.

Thus it has been found that the object of the invention can be accomplished while the disadvantages of previous arrangements can be avoided. As will be more fully appreciated by the description hereinbelow, the melting device is constructed along different lines of design from known devices and with different ways of heating.

In the following the invention will be more fully explained by the accompanying drawings which comprise a number of embodiments, but it should be understood that these are only given by way of exemplification and not of limitation.

In the drawings:

FIG. 1 shows a schematic view a conventional heating device which is used in the art;

FIG. 2 shows schematically in a perspective view a melting device according to the invention, heated by high frequency current;

FIG. 9 illustrates in horizontal section a ceramic cylinder with condenser plates arranged on the outside;

Figure 3:
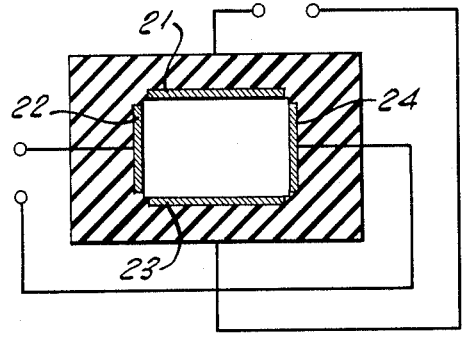
FIG. 3 shows a different embodiment in horizontal section.

FIG. 1 shows the conventional melting device comprising a grid 3 in a space 4 confined by walls extending upward and converging at their bottom, as indicated at 5, so as to form a funnel in the manner of a sump for the collection of the melt. Chips of high polymer are fed into the melting device in the direction of an arrow A and are heated to melting temperature on the grid 3, for instance by electrical resistance heating. They are then collected in molten form in the sump 5. From there they are passed on in the direction of the arrow B to the conventional pumping and filtering equipment and to a nozzle plate (not shown), where threads or other shaped articles are produced in a known manner from the melt emerging as indicated by arrow C.

Referring now to FIG. 2, a shaft is shown formed by two oppositely arranged metal plates 13 and 15 forming a condenser. The plates are insulatingly separated by plates 14 and 16. Plate 13 is connected to one pole 17 of a high-frequency source, while plate 15 is connected to the other pole 18 of the source. Preheated chips of a high polymer to be melted are supplied to the shaft in the direction of the arrow A', leaving the shaft at the bottom end 19 in the direction of the arrow B'; from there, the melt is passed on to the conventional pumping equipment, filter, and nozzle plate (not shown in the drawing). Within the shaft, the chips are subjected to the heat generated in the high-frequency field between the condenser plates 13 and 15, and melted thereby.

FIG. 3 shows a similar arrangement with four plates 21, 22, 23 and 24. In this embodiment the chips are subjected to heat generated within two electrical high-frequency fields. In this arrangement it is possible that the high frequency sources supply voltages which are out of phase to said pairs of condenser plates, or alternatively, voltages which are in phase. Due to losses as a consequence of dipole movements and simple conduction losses, the product is internally heated so that no temperature gradient will occur as is the case with external heating. Furthermore, overheating by external surfaces is avoided in this arrangement.

The condenser plates and other structural elements as well as the walls of the melting shaft must be maintained at equal temperature with the melt, in order to avoid heat losses by radiation which would again result in the overheating of the melt. The advantages inherent in the melt shaft procedure are yet enhanced when the chips fed to the shaft are preheated to a point near softening by a hot inert atmosphere such as hot nitrogen, for instance in a fluidized bed. In the melting shaft, it is then only necessary to supply the heat of fusion and a small part of sensible heat by the electrical field. At the same time it is possible to heat the melt to a higher temperature.

Figure 4:
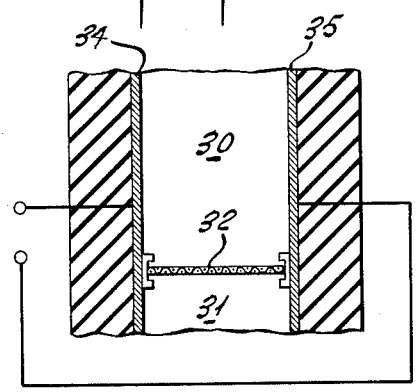
FIG. 4 is a similar arrangement shown in vertical section.

In all the arrangements shown, the chips fed in at the top of the melting shaft drop to the bottom where the melt for spinning is continuously withdrawn. On their descent the chips are being melted by dielectrical losses in the electric field and are completely molten at the bottom from where they are directly forced through the spinning nozzles by means of spinning pumps. Since it is not always possible to prevent unmelted chips from passing through the pump, an embodiment is shown in FIG. 4 wherein between the melting zone 30 and the heating zone 31 a screen 32 is insulatingly mounted between condenser plates 34 and 35. Below the screen 32 only a molten mass will exist. Should some chips drop through the shaft without melting, they will be arrested by the screen 32 where they will eventually melt under the heat of the electric field. Due to the uninterrupted flow of the product the conditions will be similar to those in an ideal flow tube so that a very narrow range of varying conditions of residence will prevail. By varying the selected condenser design and the voltage connected to the condenser plates, the melting time can be made very short so that the time which passes between the melting and the spinning, will also be very short. This enables the operator to avoid a change in the degree of polymerization of the polymer to be spun. In spinning polyamides this will result in a melt having a very low monomer content.

In this manner it is possible to make a product which is of a much better and more uniform quality than the one obtained by the melting grid process. The quantity of heat generated per unit length of path and amount of products in the melting shaft is determined by the dielectric characteristics of the product and by the force of the electric field. When the dielectrical characteristics change during the melting, a uniform heat supply will nevertheless be guaranteed by a change of the spacing of the plates with corresponding change of the force of the field. If, however, the dielectrical characteristics and the density of the substance increases during the melting it is necessary for a uniform heat supply and a constant rate of flow to make the melting shaft of the following design. The distance between the condenser plates must be increased toward the bottom, while at the same time their width and there with the inner useful width of the shaft will decrease. In some cases the spacing of the plates may be maintained constant while the cross section of the shaft may be adapted in accordance with the transition of the density of the chips to the density of the melt with a view to maintaining an even rate of flow of the processed polymer.

Figure 5:
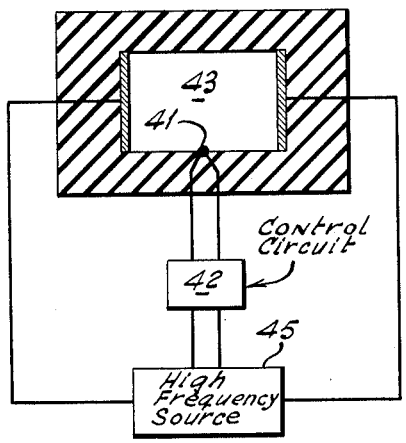
FIG. 5 shows an embodiment comprising condenser plates in combination with a thermo-element.

Should the case occur that temporarily a smaller amount of molten material is withdrawn by the spinning pump, this would result in a longer time of stay of the melt in the shaft and this in turn would lead to the danger of overheating. In order to avoid this danger, it is necessary that the voltage of the HF-field is automatically decreased. For that purpose it is, for example, advantageous to provide a thermo element arranged in the melt which is flowing off and to couple it with the source supply the electrical field. This embodiment is shown in FIG. 5 in which 41 designates the thermo element connected to a control circuit 42, said element being arranged between the melt 43 in the shaft and the high frequency source 45. If the thermo-element 41 indicates an excess temperature in the melt, the control circuit 42 will automatically decrease the high frequency field to a lower voltage. In the following the invention will be explained in an example by way of illustration and not of limitation.

A melting shaft is used in which the throughput of chips of a high polymer is 30 grams per minute. The softening point of the material is 170–180° C., the melting point 225° C. Spinning temperature 250° C. In an advantageous embodiment, the chips are preheated under nitrogen in a fluidized bed to a temperature of 160° C., in order to make it possible to feed polymer from a centrally located preheating unit to a plurality of spinning heads. In the melting shaft, the product has to be supplied with about 2.2 kcal./minute in order to heat the chips up to 250° C. This corresponds to an energy consumption of about 160 Watt in the electric field; whereas the factor $\epsilon \tan \delta$ hardly changes during the melting, the density of the melt as compared to the density of the poured chips increases to about twice the value. The plate condenser therefore must be dimensioned as follows:

Spacing of condenser plates _____ 2 cm. (unchanging).
Length of condenser plates _____ 10 cm.
Width of condenser plates:
    At feed-in _____ 4 cm.
    At discharge _____ 2 cm.

From the above the mean throughput rate in the shaft is 7 cm. per minute and the maximum length of stay of the melt in the shaft about 1.5 minutes.

With the mean dielectrical values of $\epsilon=3$ and $\tan \delta=0.1$, and a frequency of $V=25$ mHz., the generator voltage for the desired output will be 1500 volts. With a H.F. generator of 5 kw. net output, it is possible to operate about 30 spinning devices in parallel, corresponding to a production output of 1.3 tons per day.

Figure 6:
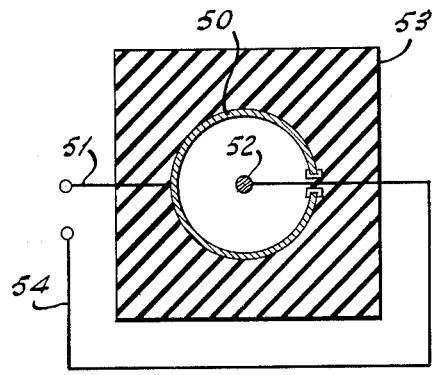
FIGS. 6 and 7 illustrate in horizontal section two arrangements in which cylindrical condensers are used.

When the local differences in the force of the field do not influence the heat absorption by the polymer too disadvantageously, a cylindrical melt shaft may be used as shown in FIG. 6, which is provided with a cylindrical condenser. In this arrangement, a cylindrically shaped condenser 50 is connected to one pole of a high frequency voltage 51, and an electrode 52 insulatingly mounted with respect to the condenser 50 in the surrounding wall 53 is connected to the other pole 54 of said source.

Figure 7:
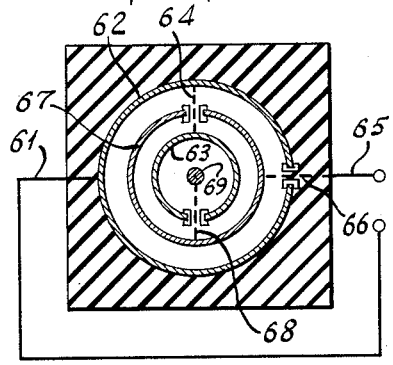

The increase in energy in the areas of low force of the field may be effected in a cylindrical condenser by the use of several concentric cylinder condensers as shown in FIG. 7.

In this figure, one pole 61 of a high frequency source is connected to an outermost cylinder 62 whereas a second cylinder 63 is connected thereto by an insulated connection 64. From the other pole of the high frequency source 65 an insulated connection 66 leads to an intermediate cylinder 67, which is in turn connected through insulation 68 to a central electrode 69.

In this manner the distribution of force within the shaft is equalized as compared to a single cylindrical condenser (as shown in FIG. 6) and the melting time is shortened.

Figure 8:
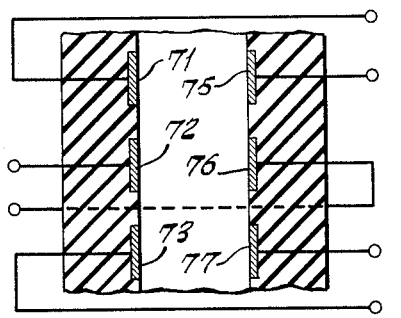
FIG. 8 shows in vertical section an arrangement of two rows of condenser plates.
Figure 8:
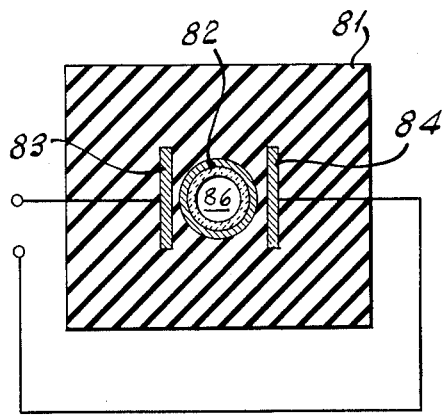

As mentioned before it is necessary for a uniform energy absorption of the polymer product along the melting shaft to equalize the force of the melting field with the changing dielectric characteristic. This can be brought about by a change in the spacing of the plates along the shaft or, in another manner, by dividing the shaft longitudinally into several plate or cylindrical condensers arranged in a row. Fig. 8 shows by way of example a plate arrangement wherein opposite plates 71, 75, 72, 76, and 73, 77 are connected to the poles of respective high frequency sources. In this arrangement the voltage of each of the three high frequency fields may be of different value.

If the polymer chips are extremely temperature-sensitive it will be necessary to make changes at the melting shaft. Instead of using a square shaft in which the high frequency field is generated by plate condensers a different arrangement is made in order to avoid the direct contact of the metallic plates with the polymer product. Such direct contact has the following disadvantages.

(1) The rate of flow of the viscous melt is lower at the corners than in the center of the shaft. Therefore, the product having a lower rate of flow is subject to the influence of the electric field for a longer time and may therefore be overheated.

(2) The hot melt is in direct contact with metal plates which have metallic lead-ins to the outside. Due to the fact that the metal has high heat conductivity, the hot product which is in direct contact with the plates will be somewhat cooled that is to say the electrical field has to continually supply the resulting heat loss.

It has now been found that the second disadvantage may be completely overcome and the first disadvantage may be met to a large extent when the shaft receives a circular cross section and the inner wall is made of ceramic or other insulating material.

In FIG. 9 an embodiment is shown wherein in an outer casing 81 a shaft of ceramic material 82 is enclosed arranged between two metal plates 83, 84, connected to a source of high frequency voltage. The size of plates 83 and 84 is larger than the inner-diameter of shaft 82. This arrangement affords the advantage that between the melt 86 and the interior of the shaft and the metallic condenser of high heat conductivity the insulation of the ceramic wall and the ceramic casing will prevent heat dissipation from the melt. Due to the cylindrical shaft design no corners are formed in which an overheating of the melt could take place as a consequence of delayed flow. It is not necessary that the inner shaft wall is made of ceramic material. It may be of some other insulating material which however must not have any undesirable effect on the melt and must not adversely influence the electrical field. One factor to be considered is, for instance, that the wall material must not become hotter in the electric field than the melt within the shaft, since otherwise there will again be an undesirable temperature gradient.

When the material to be melted is very temperature-sensitive consideration is also to be given to the fact that the marginal portions of the material which flows under gravity may assume a somewhat higher temperature, which is due to the fact that even in a melt shaft with circular cross section a velocity gradient will occur between the flow at the edge and in the center of the shaft due to adhesion of the melt to the wall and to friction therewith. The goods which are flowing at a lower rate will therefore be exposed for a somewhat longer time to the electrical field and will assume higher temperatures than the portions at the center.

Figure 11:
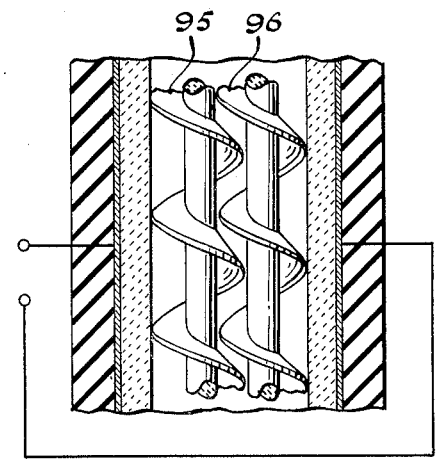
FIGS. 10, 11 and 12 illustrate in vertical section several embodiments with worm conveyors arranged inside of a cylindrical shaft and condenser plates provided outside of the shaft.
Figure 10:
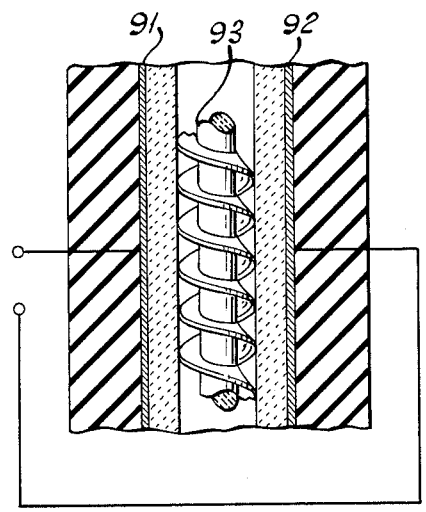
Figure 12:
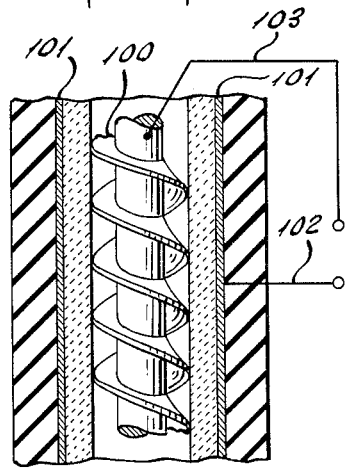

It has now also been found, in accordance with the invention, that this drawback can be overcome by providing in a circular shaft one or several screw conveyors. Several embodiments of such an arrangement are shown in FIGS. 10, 11 and 12. FIG. 10 illustrates an embodiment where between condenser plates 91 and 92 connected to a high frequency source, a screw conveyor 93 of ceramic material is arranged which closely hugs the inner wall of the shaft. In such a device the through-put rate of any individual portion of the polymer is determined only by the number of revolutions and the pitch of the screw. Every portion of the melt will now remain for the same time in the electric field so that even small deviations in temperature are avoided. Another reason for the arrangement of screws is to expedite the flow of the melt which in most cases is very viscous. Sometimes it is therefore necessary to arrange a double screw in order to sufficiently increase the pressure exerted on the melt. Such an embodiment is shown in FIG. 11 where two screws 95 and 96 are arranged in an otherwise similar manner to the one shown in FIG. 10.

Such increasing pressures by means of a double screw may also be advantageous for preventing the occlusion of gas bubbles in the melt.

The arrangement of screw conveyors which consist of ceramic material is necessary when the electrical field is generated in the shaft by means of a plate condenser which is disposed behind insulating walls of the melting shaft, as for instance shown in FIG. 9. The reason is that the material of the conveyor must not be screening off the field. In another arrangement however, where the member generating the field is of cylinderical design, the conveyer located in the center of the metallic cylinder may itself consist of electrically conductive material, e.g. of metal and can thereby be used as the second pole of the cylindrical condenser. This arrangement is shown in FIG. 12, where 100 is a screw conveyer made of metal disposed in a cylindrical condenser 101 which is directly connected to one pole 102 of the high frequency source, while the conveyer 100 is connected to the second pole 103.

It should be understood, of course, that the foregoing disclosure relates only to preferred embodiments of the invention and that it is intended to cover all changes and modifications of the devices described which do not constitute departures from the spirit and scope of the invention as set forth in the appended claims.

What is claimed is:

1. A device for making melts for spinning threads from solid polymer chips, which comprises means for preheating said chips to a point near the softening temperature, an elongated vertical shaft having a top opening for receiving said preheated softened chips for downward travel under their own weight throughout, said shaft having a melting zone for said chips, a heating zone for said melt, a screen within said shaft and insulating means for mounting the screen therein near the boundary line of said melting and heating zones, at least one pair of spaced electrodes located in the interior of said shaft a source of high frequency voltage connected to said electrodes and capable of generating a high frequency field in the path of said chips and thereby to supply heat of fusion to said preheated chips until they become a uniform melt, a bottom opening in said shaft for directly discharging said melt, and pump means for immediate delivery of said melt from said opening to a spinning device.

2. A device for making melts for spinning threads from solid polymer chips, which comprises means for preheating said chips to a point near the softening temperature, an elongated vertical shaft having a top opening for receiving said preheated softened chips for downward travel, a plurality of spaced electrodes located in the interior of said shaft, a source of high frequency voltage connected to said electrodes and capable of generating a high frequency field in the path of said chips and thereby to supply heat of fusion to said preheated chips until they become a uniform melt, a bottom opening in said shaft for discharging said melt, and pump means for direct delivery of said melt from said opening to a spinning device, wherein said electrodes comprise a plurality of cylinders arranged concentrically with respect to each other, a rod arranged in the center within said cylindrical electrodes, and means connecting said rod and one of said cylinders to one pole of the high frequency voltage and said other two cylinders to the other pole of said high frequency voltage.

References Cited by the Examiner
UNITED STATES PATENTS

| | | | |
|---|---|---|---|
| 2,217,743 | 10/1940 | Greenwalt | 18—8 |
| 2,415,025 | 1/1947 | Grell et al. | 219—10.81 |
| 2,446,557 | 8/1948 | Schutz et al. | 219—10.65 |
| 2,508,365 | 5/1950 | Bierwirth | 219—10.65 |
| 2,589,417 | 3/1952 | Mittelmann | 219—10.65 |
| 2,904,664 | 9/1959 | Rothacher | 219—10.65 |
| 3,060,297 | 10/1962 | Sargeant | 219—10.65 |

FOREIGN PATENTS

| | | |
|---|---|---|
| 1,175,080 | 3/1959 | France. |
| 682,184 | 11/1952 | Great Britain. |
| 707,799 | 4/1954 | Great Britain. |

RICHARD M. WOOD, *Primary Examiner.*

MAX L. LEVY, *Examiner.*